United States Patent [19]

Whaley

[11] Patent Number: 5,036,890
[45] Date of Patent: Aug. 6, 1991

[54] HOSE REINFORCEMENT DEVICE

[76] Inventor: H. Dean Whaley, 4840 Nebraska La., Fair Oaks, Calif. 95628

[21] Appl. No.: 598,744

[22] Filed: Oct. 16, 1990

Related U.S. Application Data

[63] Continuation of Ser. No. 846,842, Apr. 1, 1986, abandoned, which is a continuation of Ser. No. 637,213, Nov. 20, 1984, abandoned, which is a continuation of Ser. No. 481,463, Apr. 1, 1983, abandoned, which is a continuation of Ser. No. 182,219, Aug. 28, 1980, abandoned.

[51] Int. Cl.⁵ .............................................. F16L 11/10
[52] U.S. Cl. ................................... 138/109; 138/103; 138/172; 138/178
[58] Field of Search ............... 138/103, 109, 110, 131, 138/172, 178, DIG. 8; 285/114, 115, 116

[56] References Cited

U.S. PATENT DOCUMENTS

| 790,971 | 5/1905 | Nicholls | 138/DIG. 8 |
| 1,981,777 | 11/1934 | Brinkman | 285/116 |
| 2,185,741 | 1/1940 | Sorg et al. | 285/115 |
| 3,299,908 | 1/1967 | Pelzetakis | 138/122 |
| 3,610,289 | 10/1971 | Moss et al. | 138/90 |

Primary Examiner—James E. Bryant, III
Attorney, Agent, or Firm—John J. Leavitt; William A. Blake

[57] ABSTRACT

A device which may be inserted into the hydrant end of a conventional garden or water hose for the purpose of reinforcing that portion of the hose which is apt to be kinked or broken due to short bending of the hose at the hydrant end by tension imposed on the hose during use. The reinforcement device comprises a length of coiled resilient material having a resilient gasket mounted on one end thereof which may be inserted or removed from a hose at will.

2 Claims, 1 Drawing Sheet

5,036,890

HOSE REINFORCEMENT DEVICE

This application is a continuation of application Ser. No. 846,842, filed Apr. 1, 1986, now abandoned, which is a continuation of Ser. No. 637,213, filed Nov. 20, 1984, now abandoned, which is a continuation of Ser. No. 481,463, filed Apr. 1, 1983, now abandoned, which is a continuation of Ser. No. 182,219, filed Aug. 28, 1980, now abandoned.

BACKGROUND OF THE INVENTION

1. Field of the Invention

This invention relates to hose reinforcement devices, and particularly to a composite manufactured insert for insertion into the hydrant end of a hose to prevent the kinking and breaking of the hose adjacent the hydrant when tension is placed on the hose.

2. Description of the Prior Art

It is well known that one of the weak points in a conventional garden hose adapted to be attached to a hydrant, or to any type of hose which is attached at one end and which is apt to be tensioned, is the portion of the hose immediately adjacent the attached hydrant end, which has a tendency to kink and bend through a very short radius when tension is placed on the hose. The normally cylindrical hose will tend first to flatten at the kink, thus shutting off the flow of liquid therethrough, and with repeated kinking, will break at that point, thus destroying the hose, or requiring its repair. Because there has been a long-felt need for solving this problem, it is expected that many different types of solutions of the problem have been proposed. Accordingly, a search was conducted in the following classes and sub-classes for devices that solve this problem:

Class 285, sub-classes 114, 116, Dig 11
Class 138, sub-classes 96, 110, 129, 134, 136
Class 137, sub-classes 377, 378
Class 85, sub-classes 50, 51

As a result of the search in the area indicated, U.S. Pat. Nos. 1,981,777 and 2,185,741 were found, both of which teach devices which attempt to solve this problem. In addition, U.S. Pat. No. 3,610,289 and the patents cited therein are noted. Each of these patents deals in one way or another with the concept of reinforcement of a hose through which fluid is adapted to flow. Each is different in its construction from the structure presented herein, as will be seen from a mere cursory review of those patents. In most instances, the structures depicted by the prior art patents constitute structures that are integrally molded or in some other way permanently attached or mounted or built into the hose at the time it is manufactured. Others of these patents disclose structures that surround the exterior of the hose in an attempt to reinforce the hose at stress points. None of the patents, so far as I have been able to determine, teach the concept of a structure which may be purchased apart from the hose, yet which may be inserted into the hydrant-end of the hose, or removed therefrom, by the owner and user of the hose, and which when inserted in the hose, reinforces a predetermined length of the hose next adjacent the hydrant to which it is attached. Accordingly, it is one of the principal objects of this invention to provide a simple and inexpensive device that may be purchased apart from the hose and which may be inserted into the hose at the hydrant-end thereof to reinforce the hose at the hydrant end thereof.

Another object of the invention is the provision of a hose reinforcement device that may be easily and economically manufactured and which may be purchased in any size required to fit the different interior diameters of various hoses.

A still further object of the invention is the provision of a hose reinforcement device that may be positioned within the hose and which incorporates a gasket portion so as to eliminate leaks between the hose and the hydrant to which it is attached A still further object of the invention is the provision of a hose reinforcement device that may be injection molded from a synthetic resinous material or which may be fabricated from an appropriate metal.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, the hose reinforcement device of the invention comprises an elongated coiled member in the nature of an elongated spring, one end of which is equipped with a gasket member which in one aspect of the invention is detachably secured to the end coil of the spring, and which in another aspect of the invention s vulcanized to the end turn of the coil spring or which has the end turn of the spring embedded therein.

DESCRIPTION OF THE PREFERRED EMBODIMENT

Figure 1:
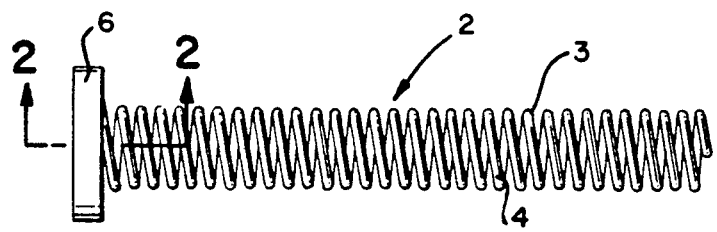
FIG. 1 is a plan view showing the hose reinforcement device in elevation.
Figure 2:
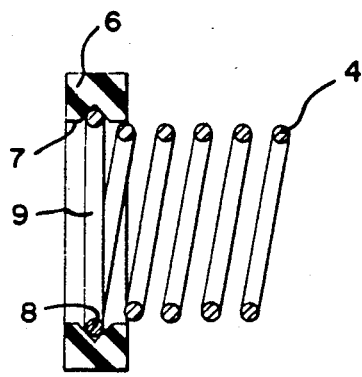
FIG. 2 is an enlarged fragmentary sectional view taken in the plane indicated by the line 2—2 in FIG. 1 and illustrating one embodiment in which the gasket member is detachably secured to the end turn of the coil spring.

In terms of greater detail, the hose reinforcement device of the invention is illustrated in FIG. 1 and is designated therein generally by the numeral 2 and comprises an elongated member 3 formed from a multiplicity of spiral coils 4 in the nature of a coiled spring. The elongated member 3 may be fabricated in various ways. For instance, the elongated member 3 may be manufactured from stainless steel, or from spring steel that has been galvanized to inhibit the formation of rust. Alternatively, the elongated coil member 3 may be injection molded from an appropriate synthetic resinous material, or it may be formed in the form of an elongated coil having a multiplicity of coils 4 by forming from an elongated length of a synthetic resinous material.

I have found that a length of from 4 to 6 inches is sufficient for its intended purpose, and that an exterior diameter of approximately ½ inch will enable placement of the device in most conventional garden hoses. Obviously, both the diameter and the length of the coiled portion 3 of the device may be increased or decreased to suit particular circumstances.

As illustrated in FIG. 1, attached to the hydrantend of the elongated member 3 is an annular and resilient gasket or washer 6, the inner peripheral surface 7 of which is formed with a V-shaped recess into which the end turn 9 of the coiled member 3 is inserted. It has been found to be an advantage to increase the diametric dimension of the end coil 9 so that a washer 6 of conventional size may be utilized to thus adapt the device for use in most conventional water hose bibs.

Figure 3:
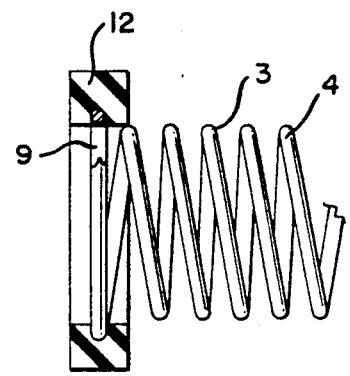
FIG. 3 is an enlarged fragmentary sectional view of an alternate embodiment in which the end coil of the spring is embedded in the gasket member.

In the embodiment of the invention illustrated in FIG. 3, the washer 12 is formed from a resilient material such as rubber or a synthetic resinous material, and the end turn 9 of the elongated member 3 is fully embedded in the body of the washer as illustrated.

Figure 4:
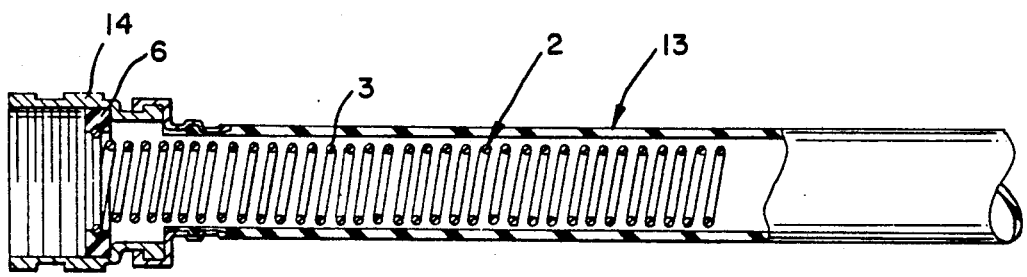
FIG. 4 is a fragmentary cross sectional view, partly in elevation, illustrating the hose reinforcement device inserted in the hydrant-end of a conventional garden hose.

The assembly of the hose reinforcement device is illustrated in FIG. 4, where a hose 13 is shown partially in cross section, the hose reinforcement device being shown inserted in the hydrant-end of the hose, with the gasket or washer 6 being seated in the hose bib 14.

Figure 5:
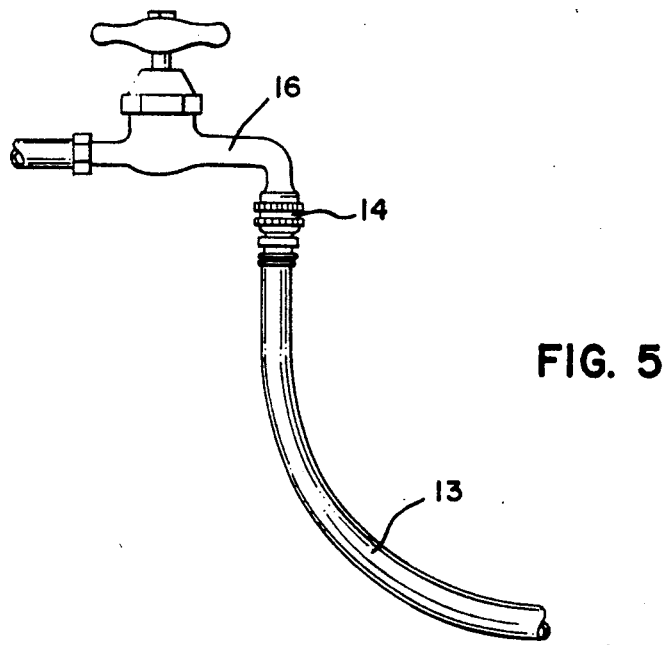
FIG. 5 is an elevational view illustrating the manner in which the hose reinforcement within the hydrant-end of the hose forces the hose to bend in a large radius which imposes very little stress on the hydrant-end of the hose.

In FIG. 5, the hose 13 is shown having its hose bib 14 attached to a hydrant 16 with the hose reinforced next adjacent the connection to the hydrant, so that when tension is placed on the opposite end of the hose, the hose will not kink or bend in a short radius closely adjacent the hydrant, but instead will form itself into a long gradual curve of large radius, thus minimizing the stress that is imposed on the hose at the hydrant end thereof.

Having thus described the invention, what is believed to be new and novel and sought to be covered by letters patent of the United States is as follows:

I claim:

1. In combination, a garden hose and a garden hose reinforcement device removably mounted on said garden hose;

said garden hose comprising an elongated flexible tube having an inner periphery and an outer periphery and having a flanged coupler rotatably secured to one end of the hose in a non-sealing manner for detachable attachment of the garden hose to a hose bib or faucet; and said hose reinforcement device including an elongated resilient coiled spring having an elongated body extending into the garden hose and having an upper end and a lower end, said spring being resistant to collapsibility in a transverse dimension, and providing a hollow interior through which a liquid may pass unobstructed, said spring having a transverse dimension less than the inner diameter of the hose, with at least one enlarged coil at said upper end of said spring having a transverse dimension larger than that of the remaining coils of the spring and the diameter of the inner periphery of said hose whereby all the coils of said spring except said one enlarged coil lie snugly within the interior of said garden hose in the portion thereof next adjacent said flanged coupler; said hose reinforcement device further including:

a flat resilient annular washer snugly and removably seated completely in said flanged hose coupler and attached to the upper enlarged end coil of said spring, and including a resilient, flat, thin, annular body having inner and outer peripheries, said outer periphery being sufficiently large to engage and snugly seat removably in the interior of the flanged coupler of said hose to provide a water-tight seal between the interior of the hose and a hose bib when said coupler is attached to said hose bib, and cooperating with said at least one enlarged coil to support said spring within the interior of said hose in the portion thereof next adjacent said flanged coupler, and said inner periphery of the washer includes a recessed groove for receiving and securing said at least one enlarged coil at the upper end of said spring, said washer being sized to provide a water-tight seal between the interior of the hose and a water hose bib, whereby upon placement of said spring in the hose and seating of said washer in the flanged rotatable coupler thereof said spring extends downwardly into said hose to prevent collapse of the hose in the portion thereof containing the spring, and the washer is sealingly interposed between the hose and a water hose bib to which the rotatable coupler is connected to prevent water leakage therebetween when water under pressure is applied to said hose.

2. A garden hose reinforcement and sealing device adapted for removable insertion into the interior of the hose bib end of a garden hose having a flanged coupler rotatably mounted on the hose in a non-sealing manner for detachable attachment of the garden hose to a hose bib or faucet to provide a water-tight seal between the hose and hose bib and to reinforce the adjacent end portion of the hose against stresses tending to cause collapse of the hose, comprising:

a) an elongated resilient coiled spring having an upper end and a lower end, being resistant to collapsibility in a transverse dimension, and providing a hollow interior through which a liquid may pass unobstructed, said spring having a transverse dimension less that the interior diameter of the hose, with at least one enlarged coil at said upper end of said spring which has a transverse dimension larger than that of the interior diameter of the hose and the remaining coils of the spring whereby said remaining coil of the spring selectively slip snugly into or out of the interior of said garden hose; and b) a flat resilient annular washer sized for insertion into the flanged hose coupler and attached to said at least one enlarged coil at said upper end of said spring, said washer comprising a resilient, flat, thin, annular body having inner and outer peripheries, said outer periphery being sufficiently large to engage and seat snugly in the interior of the flanged coupler of said hose to provide a seal between said hose and said hose bib when said coupler is attached to a hose bib, said washer cooperating with said at least one enlarged coil to support said spring within said hose adjacent said coupler on the hose, and said inner periphery of the washer including a recessed groove for receiving and securing said at least one enlarged coil at the upper end of said spring, said washer being sized to provide a water-tight seal between the rotatable flanged coupler-equipped hose and a water hose bib, whereby placement of said spring into the interior of the coupler end of the hose and seating of said washer in the flanged rotatable coupler prevents collapse and consequent breaking of the hose in the region occupied by the spring, and the washer will be sealingly interposed between the hose and a water hose bib to prevent leakage of water therebetween when said rotatable hose coupler is detachably attached to a hose bib and water pressure is applied to said hose.

* * * * *